Oct. 14, 1969

K. W. SLIPP 3,472,406

BOAT TRAILERS

Filed Feb. 23, 1968

INVENTOR.
KENNETH W. SLIPP
BY Stephen E. Rockwell
ATTORNEY

Oct. 14, 1969     K. W. SLIPP     3,472,406
BOAT TRAILERS

Filed Feb. 23, 1968     6 Sheets-Sheet 2

INVENTOR.
KENNETH W. SLIPP
BY Stephen E. Rockwell
ATTORNEY

INVENTOR.
KENNETH W. SLIPP
BY Stephen E. Rockwell
ATTORNEY

Oct. 14, 1969

K. W. SLIPP

3,472,406

BOAT TRAILERS

Filed Feb. 23, 1968

INVENTOR.
KENNETH W. SLIPP
BY Stephen E. Rockwell
ATTORNEY

Oct. 14, 1969     K. W. SLIPP     3,472,406
BOAT TRAILERS Filed Feb. 23, 1968     6 Sheets-Sheet 5

INVENTOR.
KENNETH W. SLIPP
BY Stephen E. Rockwell
ATTORNEY

United States Patent Office 3,472,406
Patented Oct. 14, 1969

3,472,406
BOAT TRAILERS
Kenneth W. Slipp, R.F.D. 3, Roast Meat Hill,
Killingworth, Conn.
Filed Feb. 23, 1968, Ser. No. 707,660
Int. Cl. B60p 1/04
U.S. Cl. 214—505
10 Claims

ABSTRACT OF THE DISCLOSURE

There is provided a trailer for cargo such as a boat having self-unloading and self-loading features as for the launching and retrieval of the boat. It comprises a wheeled axle assembly on which an elongated main frame is longitudinally slidable with reference to said assembly during boat launching and retrieval, while movable rearwardly and forwardly with the attached tow vehicle and tilting with reference thereto, said assembly being held substantially stationary during these movements as by brakes or wheel chocks. It also comprises an auxiliary frame attached to the vehicle in pivotal relation to the first-mentioned frame during launching and retrieval.

---

This invention relates to a trailer especially well suited for towing a boat and having self-unloading and -loading features as for the launching and retrieval of the boat as from a hard-surfaced boat ramp at the water's edge. It is especially designed and constructed for the accommodation of boats up to and including the largest susceptible of this type of launching where the tow vehicle carrying the loaded trailer is backed so that the trailer runs down the ramp to the water's edge and the boat is thereafter lanuched and, after use of the boat, is retrieved and loaded again onto the trailer. Such boats may be small cabin cruisers of the type powered by an outboard motor or by the now well-known inboard-outboard power unit, for example.

Prior known boat trailer constructions have in many instances been open to a wide variety of objections in their use. It appears that in at least some instances little consideration has been given either to the safety of the motoring public while a boat is being transported on a trailer or to the safety of the boat and proper performance of the trailer during such transport, especially where the boat may be of a medium to a large size for launching and retrieval on a boat ramp. Furthermore, and perhaps of equal importance, is the apparent fact that in at least some instances the effort or physical burden on the operator required to load such a boat on a trailer has been so tremendous as to impose a hazard to that person's health or specifically to his heart. Persons have been known to suffer fatal heart attacks while winching a boat on a trailer.

Another serious objection to some prior boat trailer constructions for carrying boats 16 feet in length or longer has been the difficulty encountered in floating such a boat off the trailer, that is, providing the necessary depth of water for launching, without running the wheels of the trailer into the water to such a depth that the wheel bearings are wetted. The wetting of wheel bearings, especially with salt water, is very damaging to them and can result in such deterioration that during road travel of such a trailer, after immersion of the wheel bearings, one or more of the trailer wheels may freeze on the highway, causing great inconvenience and delay to the person towing the boat and also resulting in substantial repair and replacement costs, if the user does not, after each immersion of the wheel bearings, remove the same from the trailer, clean them carefully and repack them with grease. Boat users are not apt to go to this trouble of cleaning and repacking wheel bearings.

This difficulty with the wheel bearings of boat trailers is well known and various proposals have been made to avoid the wetting of wheel bearings during boat launching and retrieval. So far as is known prior trailers, for the purpose of avoiding the above-mentioned difficulty, have employed, as shown in U.S. Patent No. 3,097,755, granted July 16, 1963, and U.S. Patent No. 3,140,003, granted July 7, 1964, a construction which consists of a main frame and at least one subsidiary frame constituting the boat cradle which is slidable lengthwise of the main frame so as to be extensible rearwardly thereof upon boat launching and retrieval. However, such trailers are open to the objection that they weigh more and consist of considerably more parts and are generally more expensive. Moreover, it is believed that they do not lessen the physical burden on the operator of winching the boat on retrieval to its fully loaded, road-riding position unless an electric winch is provided, adding to the cost of the trailer.

The present invention obviates these recited difficulties or objections. It resides in a trailer construction which is provided with a simple, economical, frame construction supported by an axle assembly which may be of the heavy-duty type, provided with relatively large boat-trailer wheels similar in size to automobile wheels. In more detail it is directed to a wheeled axle assembly on which an elongated main frame is longitudinally slidable with reference to said assembly during boat launching and retrieval, while movable rearwardly and forwardly with the attached tow vehicle and tilting with reference thereto, said assembly being held substantially stationary during these movements as by brakes or wheel chocks, the trailer further comprising an auxiliary frame attached to the vehicle in pivotal relation to the first-mentioned frame during launching and retrieval.

With reference to ease of retrieving a boat, including loading it onto the subject trailer, the trailer design and construction take most of the physical effort of the operator out of the retrieval and loading process and put this burden on the tow vehicle rather than the operator. This relative ease of retrieval and loading is accomplished by providing a boat-supporting frame which on both launching and retrieval has a very low angle of inclination with respect to the axle assembly for the reason that during launching and retrieval the axle assembly is near the front end of the frame which tilts with respect thereto. The boat in at least most instances may be winched with relative ease on retrieval so that its bow is brought up against the bow rest while considerable buoyancy is still imparted to the boat hull by the water, which buoyancy is still imparted to the boat hull by the water, which buoyancy is of substantial assistance to the operator during the winching operation. Then, while movement of the axle assembly is restrained, the frame is pulled forwardly by the towing vehicle until the boat, to which it is attached by the winch cable or rope, is fully supported on the frame and tilted up to its road-riding position.

One object of the invention is to provide a boat trailer for medium- or large-sized boats for launching and retrieval on a ramp, which is of rugged economical construction capable of sustained turnpike speeds without undue risk to the motoring public or risk of damage to the boat or, for that matter, the trailer; and having relatively large boat trailer wheels and a strong frame.

Another object is to provide, for ease of launching and retrieval of a boat, a trailer which comprises a wheeled axle assembly on which an elongated main frame is longitudinally slidable with reference to the axle assembly during boat-launching and retrieval, while movable rearwardly and forwardly with the tow vehicle and tilting with reference thereto, the axle assembly being held substantially stationary during these movements as by brakes or wheel chocks, which also comprises an auxiliary frame attached to the tow vehicle in pivotal relation to the first-mentioned frame during launching and retrieval.

Further objects of the invention will be apparent from the following detailed description of the presently preferred form of the trailer.

Figures 1, 2, 3:
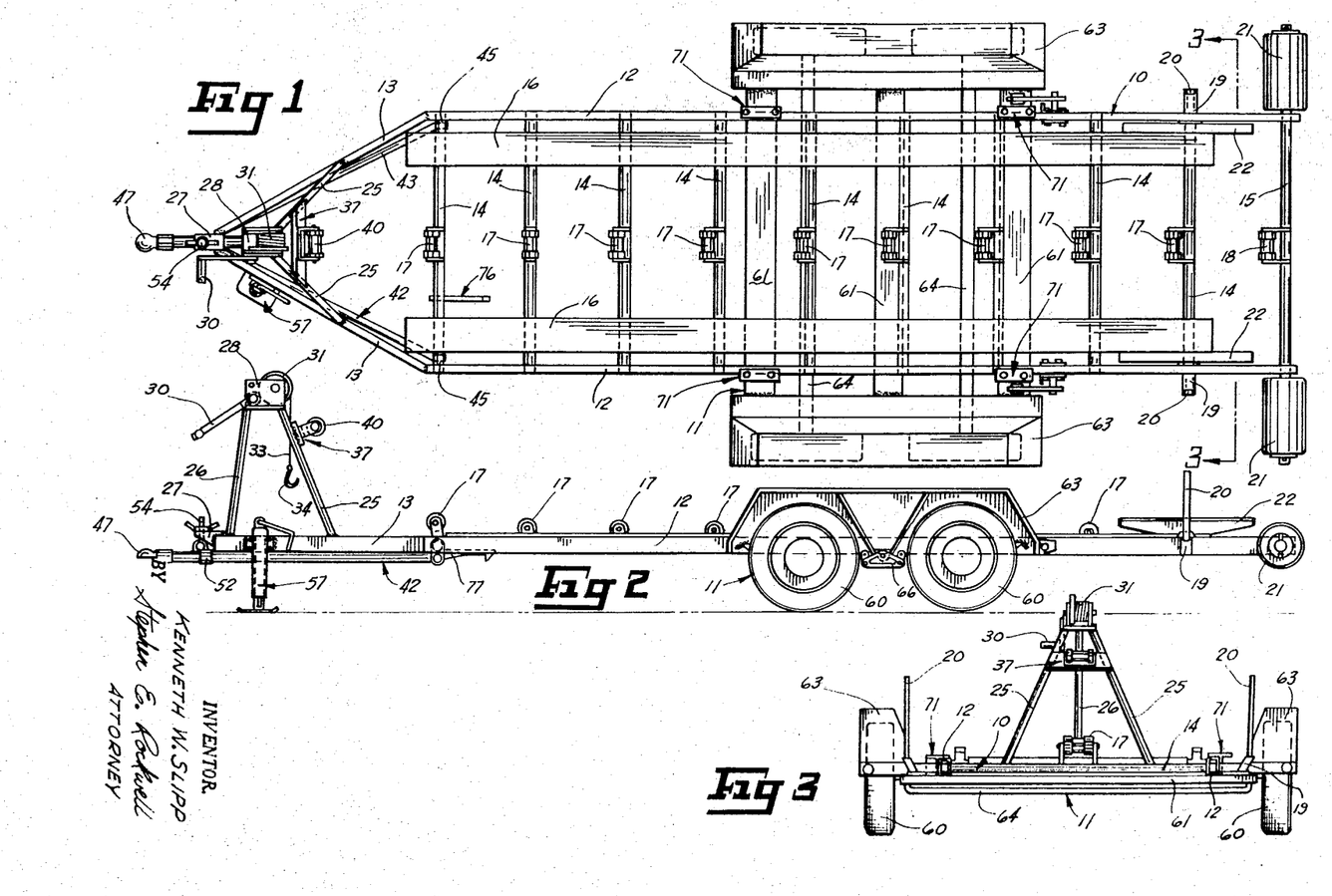
FIG. 1 is a top plan view of a trailer embodying the invention.
FIG. 2 is a side elevational view of the trailer.
FIG. 3 is a sectional view taken on line 3—3 of FIG 1.

In the drawings the main frame of the trailer is indicated generally at 10 and the wheeled axle assembly is indicated generally at 11. The main frame is elongated and is shown as having tubular longitudinal side members 12 constructed of a suitable metal, these members being arranged in parallelism with one another and in spaced-apart relation as shown in FIG. 1. At their forward ends similar tubular members 13 are secured as by welding so that they converge toward one another in a forward direction. They may be suitably joined at their forward ends, their rear ends being connected to the respective frame members 12, as previously indicated.

The tubular members 12, which may be considered side rails of the main frame, are interconnected at longitudinally spaced intervals by cross beams 14 which may also be hollow or of tubular shape and are illustrated as being of cylindrical form. The beams 14 are suitably connected to the side rails 12 as by welding. A similar beam 15 is provided at the rear end of the trailer extending through the respective side rails 12 and welded thereto, the beam 15 having ends projecting beyond the respective side rails 12 for a purpose which will be apparent hereinafter.

A pair of longitudinal walk-way planks 16 rest and are supported on the upper surfaces of the beams 14 in laterally spaced-apart and parallel relationship as best shown in FIG. 1. Suitable means (not shown) may be provided to secure these planks to at least certain of the cross beams 14 to prevent their dislocation with reference to the main frame.

Longitudinally aligned on the main frame and supported from the central regions of the respective cross beams 14 are grooved rollers 17 angularly arranged and suitably supported on the corresponding cross beams to receive and support the keel of the boat to be carried by the trailer. A similar roller 18 is provided on the cross beam 15. The cross beam 14 nearest the cross beam 15 has adjacent its respective ends outwardly of the respective side rails 12 and welded to the side rails, supports 19 for a pair of upwardly extending postlike members 20, as shown in FIGS. 1 through 3 and 13, for example, which postlike members serve as hull guides to center the boat hull with reference to the main frame, especially on retrieval of the boat after launching.

Figure 13:
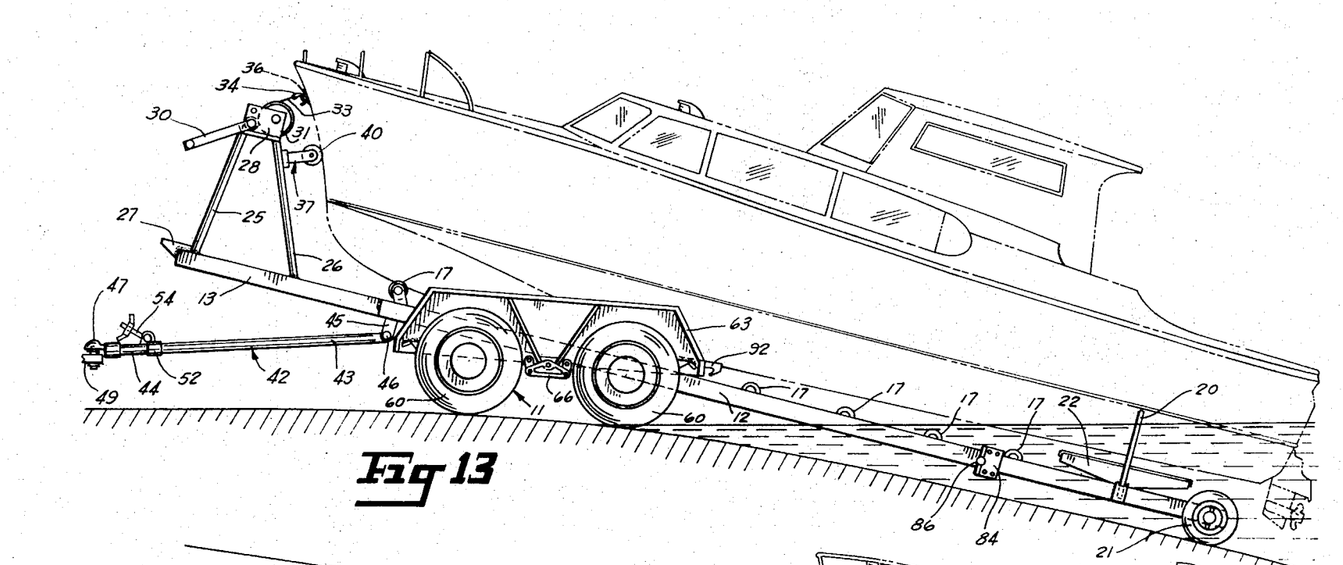
FIG. 13 is a side elevational view showing a boat on the trailer about to be launched or during a retrieval operation.
Figure 14:
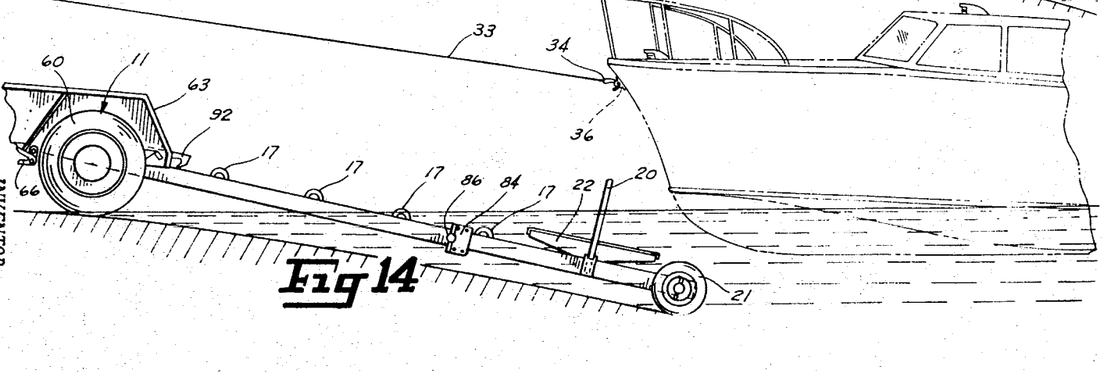
FIG. 14 is a similar view showing the boat with reference to the trailer as it appears either subsequent to the position which it occupies in FIG. 13 or prior thereto depending on whether the boat is being launched or retrieved.

The aforementioned projecting ends of the cross beam 15 at the rear of the main frame carry hollow sealed rollers 21 thereon for rotation on the cross beam 15 and suitably secured against axial displacement. These rollers 21 are shown as formed of metal, and they are sealed as aforesaid, to provide buoyancy to the rear end of the main frame. However, during launching of the boat and also retrieval of the same, these rollers 21 may be supported by the surface of the launching ramp as illustrated in FIG. 13. Unlike the illustrated positions of these rollers indicated in FIGS. 13 and 14, they may float up with the rear end of the main frame during launching and retrievel, depending on launching conditions and the axial displacement of the boat on the trailer. Wheels having pneumatic tires thereon (not shown) may be substituted for the rollers 21 if desired.

A pair of longitudinally arranged elongated boat cradle members 22 are provided, each disposed inwardly of one of the side rails 12 and supported from the last-mentioned side rail 12 for pivotal movement on a horizontal axis as at 23. These cradle members engage the under side of the bottom of the boat and are self-aligning with reference thereto.

Figure 5:
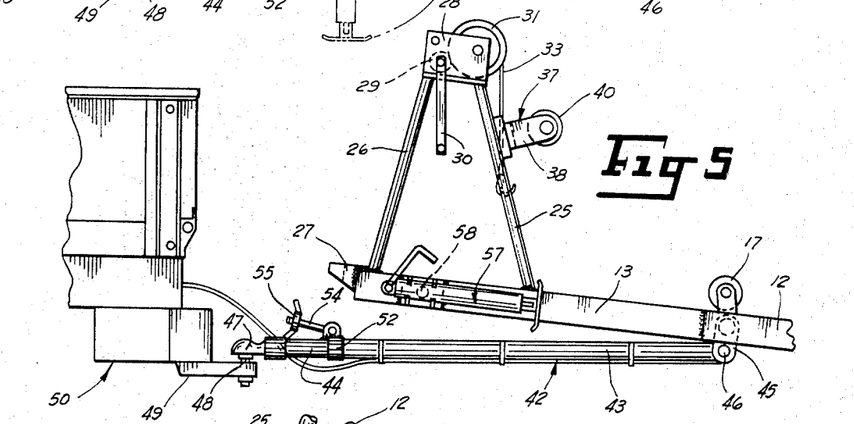
FIG. 5 is a view similar to FIG. 4 but illustrating the main frame of the trailer in tilted position with reference to the aforementioned auxiliary frame.
Figure 6:
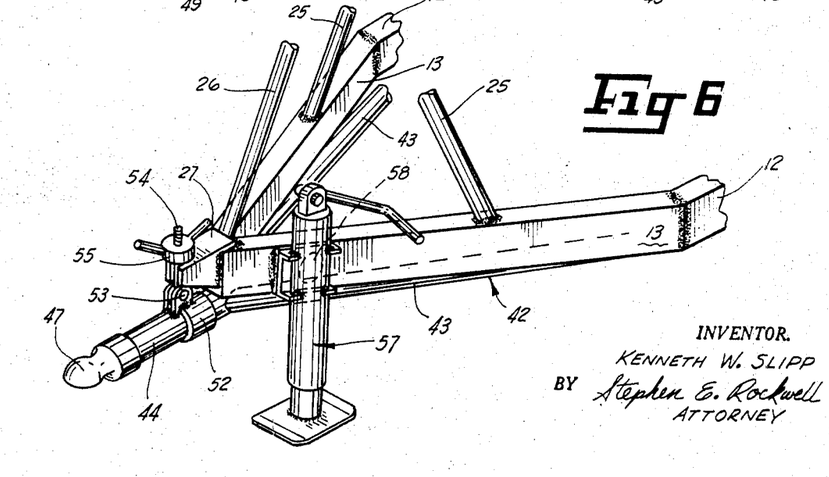
FIG. 6 is a fragmentary perspective view on a larger scale of the front end of the trailer showing the latter detached from the towing vehicle and supported from the ground.

At the forward end of the main frame there is provided (FIGS. 4, 5 and 6) a tripod comprising a pair of legs 25 and a leg 26. The lower ends of the legs 25 are welded to the upper surfaces of the respective frame members 13 and the lower end of the leg 26 is welded to the junction of the last-mentioned frame members which includes a forwardly extending notched fitting 27, the function of which will appear hereinafter.

The aforementioned tripod supports at its upper end a winch support 28 suitably secured to the upper ends of the legs of the tripod, and the winch support 28 supports a rotary gear element 29 driven by a hand crank 30 and meshing with gear teeth, not shown, provided on a cable or rope drum 31 on which a line 33 is wound having a hook 34 at its end for reception in an eye fitting in the boat stem of the boat, the eye fitting being indicated at 36.

The tripod legs 25 also support a bow rest, indicated generally at 37, extending between the last-mentioned legs and welded thereto and supporting in rotary relationship a roller 40 for the stem of the boat to rest against when the boat is fully winched on the main frame. Conventional means, not shown, are provided to lock the winch when the boat is in the last-mentioned position after retrieval.

Extending below and forwardly of the front end of the main frame 10 of the trailer is an auxiliary frame, indicated generally at 42, which is best shown in FIGS. 1 and 4 through 6. The auxiliary frame is made up of tubular frame members 43, each having an end converging toward the end of the other and welded to one end of a draw bar member 44. A pair of brackets 45 is provided to support each member 43 for pivotal movement on a horizontal axis as at 46. The brackets, one inside and adjacent each rail 12, are suspended from the foremost cross beam 14 and are welded for rigid support from the main frame 10.

At the forward end of the draw bar 44 there is provided the usual socket-forming means 47 forming one element of a coupling which cooperates in a conventional manner with a ball, not shown, carried by the stem 48 (FIG. 4) of a trailer hitch 49 suitably secured to the frame of a towing vehicle indicated generally at 50. In the drawings the trailer hitch is shown as provided on a pick-up truck, but the illustration is only by way of example, and it is to be understood that the hitch may be supported from an automobile frame so that the boat and trailer may be trailed by an automobile. The mechanism for latching the ball in the socket-forming means 47 of the coupling is conventional and has been deleted from the drawings for simplicity of illustration of the invention as the coupling between the trailer and towing vehicle forms no part of the invention.

Rearwardly of the coupling element 47 on the tow bar 44 (FIG. 6) there is provided a split collar 52 having a pair of upstanding ears receiving a bolt 53 therethrough. The bolt 53 provides a pivotal support for an eye bolt 54. The bolt 53 passes through the eye of the bolt 54. As shown in the last-mentioned view, a nut 55 is threaded on the bolt 54. The bolt 54 is swingable into and out of the notched fitting 27 of the main frame when the bolt is loosened. The nut 55, when turned down on the fitting 27, serves to hold the main frame 10 and the auxiliary frame 42 in the angular position shown in FIG. 4. However, when the nut 55 is loosened and the eye bolt 54 swung out of the fitting 27, as shown in FIG. 5, relative pivotal movement is permitted between the last-mentioned frame elements on the horizontal axis 46. In addition, as will appear more fully hereinafter, the auxiliary frame 42 may pivot at its forward end at the ball-and-socket connection of the trailer to the vehicle on a horizontal axis, as shown in FIG. 13. It will be appreciated from the foregoing that the nut-carrying eye bolt 54 carried by the auxiliary frame cooperates with the fitting 27 on the main frame 10 to constitute a hold-down device.

Also located at the forward end of the trailer is a swingably mounted foot, indicated generally at 57, arranged to pivot on a horizontal axis as at 58. The foot 57 is provided for supporting the front end of the trailer from the ground when the trailer is unhitched from the towing vehicle so that the trailer may be supported in substantially parallel relation to the ground. The foot and its mounting form no part of the invention, and the mounting of the foot may be conventional. In the illustrated form, the foot 57 takes the form of a jack which permits the front end of the trailer to be raised or lowered to the desired height.

The wheeled axle assembly 11, illustrated in the drawings by way of example, provides four relatively large wheels 60 having pneumatic tires thereon. The wheels and tires may be of a size similar to a size used on automobiles. The tires are of a much greater diameter than the rollers 21 on the main frame, as shown in FIG. 2. The axis of the rollers 21 is also disposed in a plane above the axes of the wheels 60, as shown in the last-mentioned view.

As shown in FIGS. 1 and 2, the wheels 60 are arranged in pairs, the wheels of each pair being arranged in tandem. The wheels are supported from an axle frame comprising three frame members 61 transversely arranged with reference to the main frame 10 of the trailer and longitudinally spaced with reference thereto. The frame members 61 are of inverted channel shape and a pair of fender units 63 are welded to the corresponding ends of the frame members 61 to interconnect them and support each from the other. The frame members 61 underlie, FIG. 10, the side rails 12 of the main trailer frame and support at their ends the pair of fender units 63 projecting over the respective pairs of wheels 60, as indicated in FIGS. 1 and 10.

Figures 10, 11, 12:
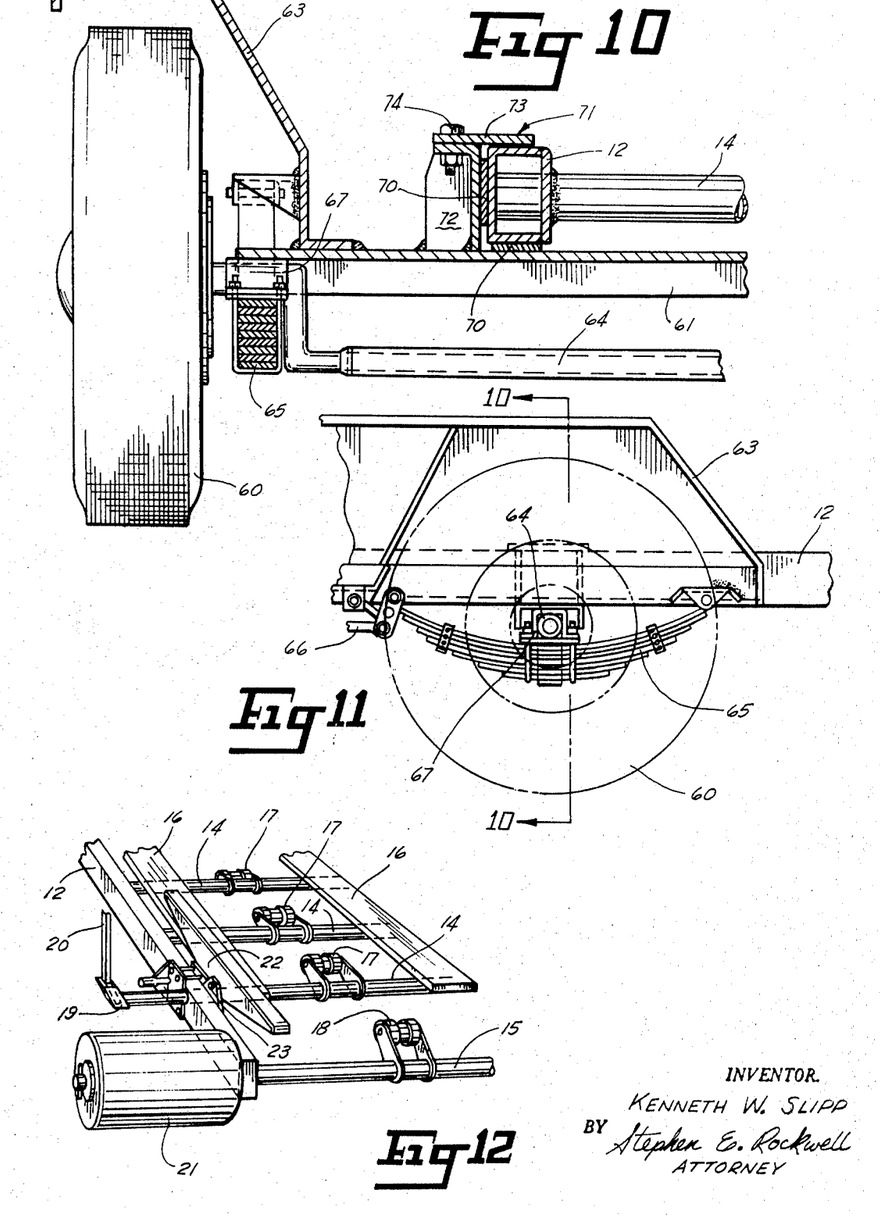
FIG. 10 is an enlarged sectional view taken on line 10—10 of FIG. 11.
FIG. 11 is a fragmentary view illustrating a wheel suspension of the trailer.
FIG. 12 is a fragmentary perspective view of the rear end of the trailer.

A pair of axles 64 are provided for the two pairs of wheels 60, one being shown to advantage in FIG. 10 for illustrative purposes. In the illustrated form, the axles 61 are suspended in a conventional manner through springs 65 suitably supported from the frame members 62 so that the wheels of each pair have a "walking" action, the spring 65 associated with each wheel of one pair having a conventional link connection 66 to the spring of the other wheel of the pair. The axles 64 are connected to the respective springs as by straps 67 bolted (FIG. 10) thereto and to the axles at the respective ends of the axles. The wheeled axle assembly 11 may comprise only a single axle and a single pair of wheels, not shown, if desired.

As the main frame 10 is slidable longitudinally of the latter with reference to the wheeled axle assembly and is supported by the latter, it is necessary to interpose between the main frame and the wheeled axle assembly, including the frame members 61 of the latter, antifriction devices of which there are various types including such elements as balls or rollers. However, in the presently preferred form illustrated by way of example, I have chosen to use for antifriction bearing purposes sheets or plates 70 of oil impregnated bearing material, such plates being employed in each of four bearing units indicated generally at 71.

The bearing units are arranged in pairs, one on the foremost frame member 61 of the axle assembly and one on the rearmost frame member 61 of the last-mentioned assembly. The antifriction devices 70 are likewise arranged in pairs, one pair to each bearing unit 71. As shown in FIG. 10, one antifriction device 70 is disposed between the corresponding rail 12 and the upper surface of the corresponding transverse frame member 61 of the axle assembly. It may be secured to the latter by recessed screws, not shown. The corresponding bearing unit 71, as shown in FIG. 10, has a flange 72 welded to the upper surface of the last-mentioned transverse frame member 61 and supports in a similar manner as by screws, not shown, the other antifriction device 70 interposed between the flange and the outer side surface of the corresponding rail 12 of the main frame. A hold-down plate 73 of the bearing unit 71 extends over the upper surface of the last-mentioned rail 12 and is bolted to the flange 72 as at 74.

Owing to the aforementioned construction and arrangement of parts, the main frame 10 may slide longitudinally thereof with the auxiliary frame 42 with reference to the wheeled axle assembly when the two are not latched together or when one is not abutting the other as will appear more fully hereinafter, on forward and reverse movement of the towing vehicle. The abutments on one for cooperation with the other and the aforementioned latches will be described hereinafter.

Figure 4:
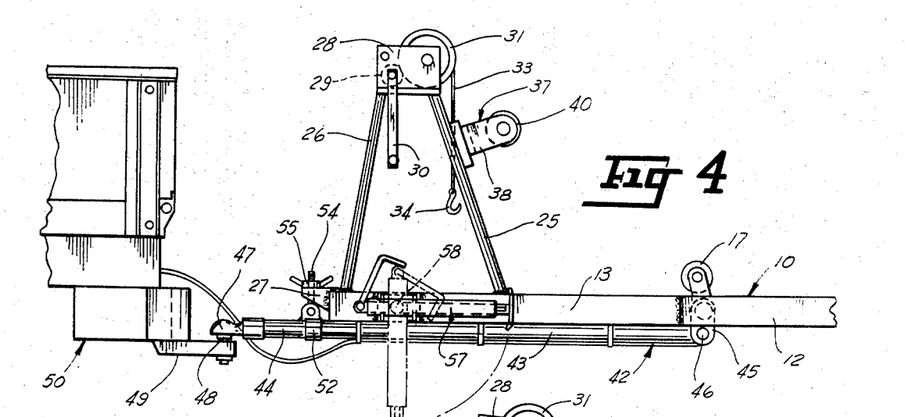
FIG. 4 is an enlarged fragmentary view showing the front end of the trailer in elevation, illustrating the latter hitched to a towing vehicle, the trailer being unloaded.
Figure 7:
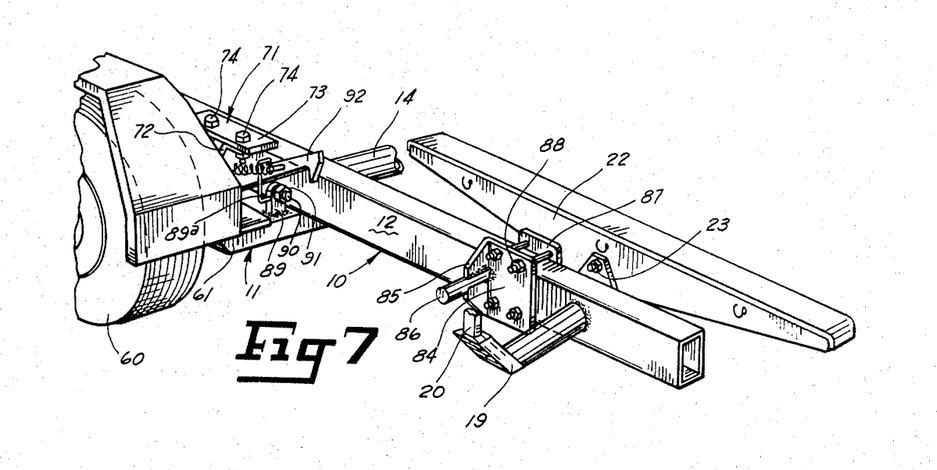
FIG. 7 is a fragmentary perspective view illustrating certain parts of the trailer in positions which they may occupy when the main frame is unlatched from the axle assembly for sliding movement with reference thereto.

When movement of the wheeled axle assembly in a rearward direction is restrained as by chocks under the wheels, not shown, or a conventional brake system such as an electrical brake system which is preferred, the details of which are not shown, and the main frame of the trailer is unlatched or in the condition shown in FIG. 7, the foot 57 is swung upwardly to the horizontal position of FIG. 4 and the main frame is attached to the tow vehicle, as shown in FIG. 4, the tow vehicle may be backed to slide the main frame rearwardly until the aforementioned brackets 45 supporting the auxiliary frame 42 abut the leading surface of the foremost transverse frame member 61 of the axle assembly, at which point rearward movement of the main frame with reference to the axle assembly is stopped.

To prevent rearward sliding movement of the axle assembly on the main frame from the last-mentioned position thereof, if the brakes are subsequently released, a spring-actuated latch mechanism, indicated generally at 76, is provided on the foremost cross beam 14 of the main frame. The latch mechanism 76 is shown to advantage in FIGS. 16 and 17. The latch mechanism comprises an elongated member 77 pivoted intermediate of its ends as at 78 to a bracket 79 mounted on the last-mentioned cross beam 14 in fixed relation thereto. A tension spring is interposed between the member 77 and the bracket 79, urging the member 77 in a clockwise direction. The member 77 has at one end an angled tail part 80 engageable with the cross beam 14 to limit movement in the member in the last-mentioned direction. The other end of the member 77 is formed as a hook having a catch surface 81 and an inclined cam edge or face 82. The construction and arrangement is such that as the main frame is moved rearwardly on the axle assembly, the cam surface 82 of the member 77 engages the leading edge of the foremost transverse frame member 61 of the axle assembly to be cammed upwardly thereby from the position of 16 so that the member 77 latches over the trailing face of the last-mentioned frame member 61 with the abutment surface 81 of the member 77 engaged with the last-mentioned frame member to prevent rearward sliding movement of the axle assembly on the main frame 10. This is important on a launching ramp because otherwise, if the trailer were left on an inclined surface such as a ramp and the trailer brakes were inadvertently released or the chocks were moved from under the wheels, the axle assembly would roll down the main frame connected to the tow vehicle and run into the water, perhaps damaging the axle assembly as by wetting the wheel bearings thereof.

Figure 8:
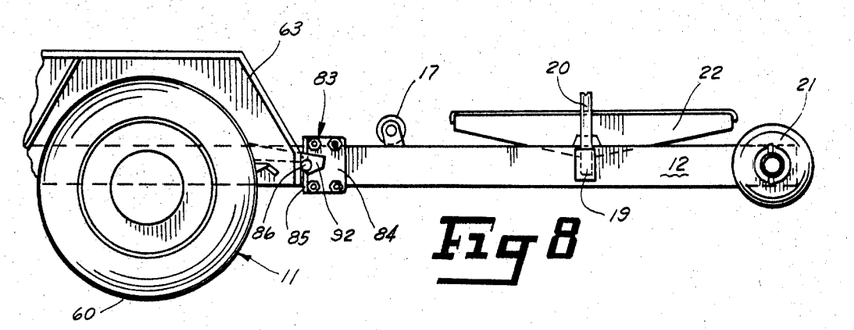
FIG. 8 is a fragmentary side elevational view showing these parts latched together to prevent axial shifting movement of the main frame with reference to the axle assembly.
Figure 9:
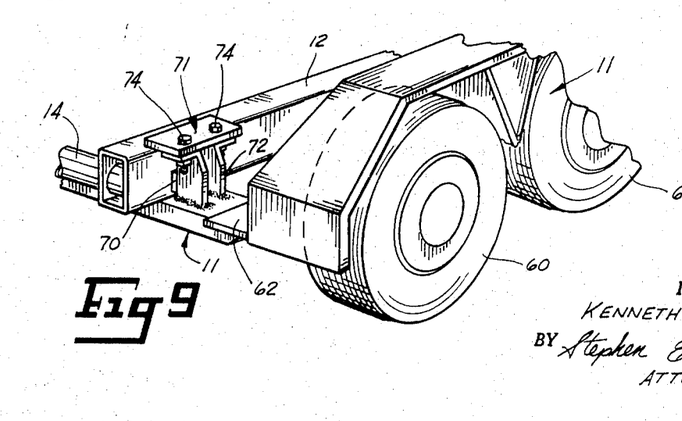
FIG. 9 is a fragmentary perspective view showing the details of one of the supports for the main frame on the axle assembly.

As best shown in FIG. 7, a push-pull device, including a latch, is provided between the wheeled axle assembly and the main frame at each side of the trailer, the device being shown in its inoperative position in FIG. 7 and being shown in its operative position in FIG. 8, and indicated generally in the last-mentioned view at 83. The push-pull device includes a flange 84 (FIG. 7) engaging the outer side face of the corresponding side rail 12 of the trailer and having a portion 85 thereof at right angles thereto and extending outwardly from the rail 12. Also extending outwardly with the flange portion 85 in the central region thereof and secured thereto as by welding is a pin 86 which extends beyond the flange portion 85. The flange 84 is secured to the last-mentioned side rail by means of a back-up plate 87 to which it is bolted, as at 88, so that the back-up plate 87, which is on the inner face of the last-mentioned side rail 12, clamps the flange 84 to the side rail through the aforementioned bolts 88. It will be noted that the aforementioned flange 84 and its associated parts together with the back-up plate 87 are located on the frame 10 rearwardly of the wheeled axle assembly.

To cooperate with the aforementioned flange portion 85 fixed to the trailer frame 10 there is provided on the rearmost transverse frame member 61 of the axle assembly an upstanding flange 89 welded to the upper face thereof and having a threaded opening for reception therein of a threaded stud 90. A lock nut 91 is threaded on the stud 90 to abut the flange 89 and lock the stud in its threaded adjusted position. When the push-pull device 83 is in the operative position of FIG. 8, the flange portion 85 on the main frame on forward movement of the frame, as by a forward pull by the tow vehicle, abuts the stud 90 and through it exerts a pushing force on the wheeled assembly so that the trailer may move along in the forward direction with the towing vehicle.

The aforementioned latch of the push-pull device includes a latch member 92 having a hooked end similar to the latch member 77. That is, it is similarly pivoted and has the same or similar camming and abutment surfaces. It is spring urged by a tension spring 93 reacting between the wheeled axle assembly and the latch member 92 and the spring is so arranged with reference to the conventional pivot point, not shown, that the spring 93 acts like a toggle in that it will hold the latch 92 open when the latter is raised to the open position of FIG. 7 by hand and will maintain the latch member 92 in a downward position from that shown in FIG. 7 by hand so that when the frame 10 is drawn forwardly from the position shown in FIG. 7 to the position shown in FIG. 8, the latch member 92 is cammed upwardly against the influence of the spring 93 by the pin 86 associated with the flange 84 on the frame to engage over the pin 86 as shown in FIG. 8. An abutment for the latch member 92 is provided to limit upward movement of the last-mentioned member from the position of FIG. 7. It comprises a wire element 89ᵃ (FIG. 7) having one end secured as by welding to the flange 89 and having a free end extending laterally above the latch member 92. When the towing vehicle is backed with the trailer attached, the wheeled axle assembly is pulled by the frame, in this instance through each latch 92 and the corresponding pin 86. It is believed that this construction and arrangement whereby the axle assembly of the trailer is pushed forward by the trailer frame and pulled in a rearward direction rather than the usual arrangement wherein the frame is pulled in one direction or the other by the wheeled axle, is unique, and results in superior boat-trailing characteristics due to the fact that the pull or push from the towing vehicle is transmitted, in effect, directly to that part of the trailer which supports the boat.

The operation of the above-described boat trailer will be understood from the foregoing description of its elements and their arrangement with one another. The trailer of the invention may be employed to launch a boat from a bank some distance above the water level, as a bank of a river. However, launching and retrieval operations are illustrated in the drawings showing the boat trailer in FIGS. 13, 14 and 15 on a launching ramp. The ramp slopes off in the usual manner into the water as indicated. To launch the boat from the trailer, the trailer is backed on the ramp until the rearmost trailer wheels are near or at the water's edge, the operator being careful not to immerse the wheel rims and, even more importantly, the wheel bearings. Then, if the trailer is provided with brakes, these brakes are applied to restrain the axle assembly from further rearward movement. If the trailer is not provided with brakes, chocks are put under the rearmost wheels to restrain the last-mentioned movement. The above-mentioned latches 92 between the wheeled axle and the main frame 10 are released by hand and the operator also releases the hold-down device comprising the fitting 27 and the eye bolt 54 so that the main frame 10 may pivot with reference to the auxiliary frame 42. Any lights on the rear end of the trailer which might be damaged by immersion in water are removed from this end of the trailer.

Then, while rearward movement of the trailer wheels continues to be restrained, the towing vehicle is backed up causing the main frame and the auxiliary frame to slide rearwardly with the boat with reference to the axle assembly. When the center of gravity passes the midpoint between the pair of wheels shown in FIG. 15, the main frame tilts downwardly from the position of FIG. 15 to the position of FIG. 13. The rollers 21 at the rear end of the trailer may bottom on the ramp, and during this movement the aforementioned auxiliary frame 42 may pivot on a horizontal axis on the ball of the trailer coupling, as shown in the last-mentioned view. The main frame 10 of the trailer may be moved rearwardly by the towing vehicle until the brackets 45 supporting the auxiliary frame 42 strike the leading face of the foremost transverse frame member 61 of the axle assembly and rearward movement of the main frame is stopped thereby.

Figure 16:
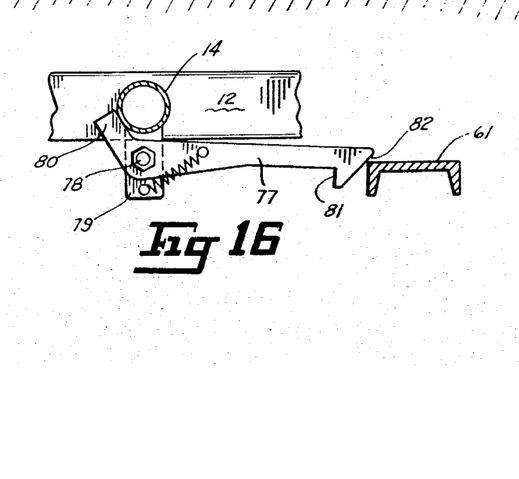
FIG. 16 is an elevational view partly in section, illustrating details of an additional latch mechanism between the main frame and the axle assembly, showing the latch mechanism unlatched.
Figure 17:
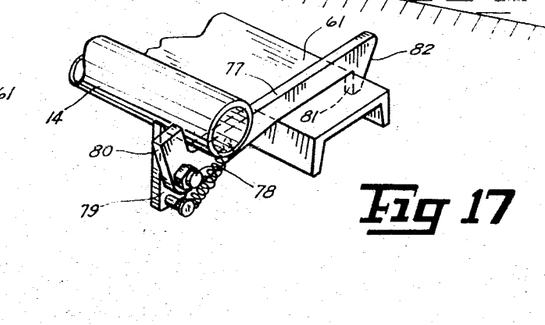
FIG. 17 is a view of the latch of FIG. 16 but shown in perspective, illustrating the mechanism in latched condition.

Also during this movement the latch member 77 carried by the main frame is moved from the position of FIG. 16 to the position of FIG. 17 so that thereafter, if restraint of rearward movement of the trailer wheels is released, the axle assembly will not roll down the ramp, sliding on the main frame, into the water.

As indicated in FIG. 13, during this movement of the trailer parts the stern of the boat may have sufficient buoyancy to float off the rear end of the trailer. Thereafter the winch drum 31 is unlocked to permit paying out of the line on the drum as the boat is moved rearwardly off the trailer guided by the upright rods 20 on the rear part of the trailer. The winch line 33 and the hook 34 on the end thereof may thereafter be released from the eye 36 in the boat stem and the boat controlled by other lines, if necessary. It will be readily apparent that during this launching operation the operator may walk down either of the walk-ways 16 provided on the main frame. The boat is shown in launched condition in FIG. 14.

Usually after launching of the boat the towing vehicle and trailer will not be left on the launching ramp but will be pulled up to a parking area. The operation of the trailer during this procedure is the same as the procedure for retrieving the boat and hence will not be separately described. On retrieval of the boat, when the trailer is in the position shown in FIG. 14, the operator moves the latch members 92 downwardly by hand so that they may be later cammed upwardly by the corresponding pins 86 and thereafter latched under the influence of the corresponding springs 93. The line 33 from the winch is secured to the boat stem and the boat is hauled in towards the trailer with the hull guides 20 of the trailer acting to center the hull with reference to the trailer. This part of the boat retrieval does not require much exertion by the person retrieving the boat.

When the keel of the boat hull engages one or two of the trailer rollers 17 and is centered thereby, winching of the boat to the position of FIG. 13 by operation of the winch crank handle 30 is relatively easy for the operator due, first of all, to the buoyancy imparted to the aft part of the boat hull by the water. In FIG. 13, the hull is stopped on the main frame by the bow rest 37. As shown in FIG. 13, the boat is fully winched and no further winching operation is required. Thereafter, the latch member 77 is released manually from the position of FIG. 17 and the tow vehicle is moved, after the winch is locked, in a forward direction while movement of the wheeled axle assembly in a forward direction is restrained so that the main frame slides forwardly with reference to the last-mentioned assembly and ultimately tips up to the position of FIG. 15 as the center of gravity passes the aforementioned point midway between the pair of wheels shown in the last-mentioned view.

Figure 15:
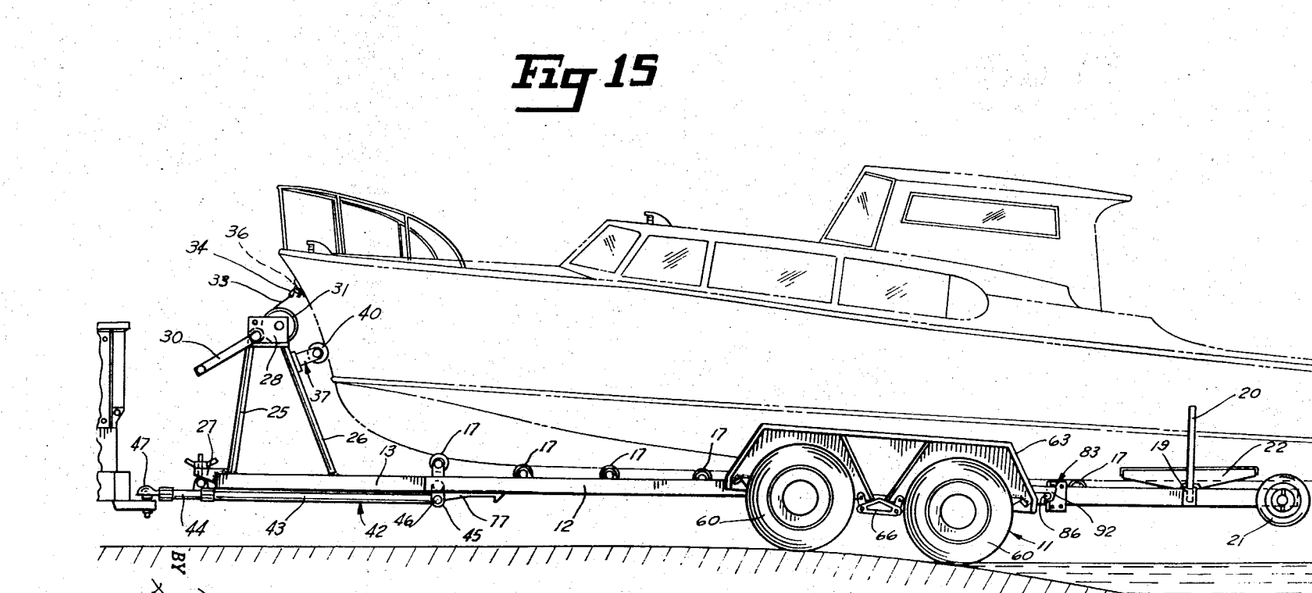
FIG. 15 shows the boat on the trailer with the main frame hauled forwardly on the axle assembly and tilted up to its riding position by the towing vehicle subsequent to the position of FIG. 13 on retrieval of the boat.

As indicated in this view, the boat is fully loaded on the trailer and the hard work of getting the boat up on the axle assembly and to tip up to this position has been done by the towing vehicle, not the operator. Thereafter, the aforementioned hold-down device, comprising the fitting 27 and the eye bolt 54, is rendered operative, and any trailer lights, not shown, previously removed from the trailer may be replaced thereon. The boat and trailer are then in condition to be towed away.

It is very important to note that during the winching of the boat to the position of FIG. 13 on retrieval, the low inclination of the main frame of the trailer facilitates the winching operation to a very large extent, and that this low inclination of the main frame is due to the fact that the trailer wheels have shifted forwardly with reference to the trailer frame so that they approach the forward end thereof. Many known trailer constructions employ a tilting bed for a boat which pivots on an axis substantially midway between the ends of the trailer bed so that in many instances the bed may have an exceedingly steep pitch when the operator attempts to retrieve the boat, thus making winching of the boat very difficult.

It should also be noted with reference to the invention that inasmuch as the boat may be partly afloat when the boat is fully winched, as shown in FIG. 13, the hull guides 20 are necessary to center the boat with reference to the trailer as the boat is drawn out of the water with the trailer by the towing vehicle, so that the aft portion of the keel may be centered correctly on the rearmost rollers 17 and 18 of the trailer. It may be noted also that the rollers 21 on the trailer when the trailer is in road-riding position may have substantial clearance with the road. The foot 57 may be rendered operative to support the front end of the trailer after the trailer with the boat upon it has been unhitched from the towing vehicle.

While only one form of the trailer has been illustrated in the drawings and described above, it will be apparent to those versed in the art that the invention may take other forms and that the trailer is susceptible of various changes in details without departing from the principles of the invention.

For example, though not shown, the aforementioned pivoted cradle members 22 may be mounted for vertical and longitudinal adjustment on the main frame 10 of the trailer in accordance with the size and shape of the boat hull.

What I claim is:

1. In a boat trailer, a wheeled axle assembly including a supporting unit supported from the wheels of the assembly, an elongated main frame on the supporting unit and having boat cradle means thereon in axially fixed position with reference thereto, means interposed between the supporting unit and the main frame in axially fixed relation to one of these elements and including antifriction devices, for longitudinal sliding movement of said frame on launching a boat therefrom and retrieving it as a tow vehicle is moved rearwardly and forwardly while movement of the wheels of the axle assembly is restrained, pivotal means of interconnection between the tow vehicle and the main frame operative during launching and retrieval of the boat as the tow vehicle is moved as aforesaid, said pivotal means permitting the main frame to pivot during said longitudinal movements thereof, antifriction rollers on the main frame engageable with the boat hull to enable the boat to slide off the main frame when the latter is projected rearwardly by the tow vehicle and tilted by gravity during this movement, coacting means between said axle assembly and the main frame for limiting rearward movement of the latter relatively to the former when movement of the wheels is restrained, and coacting means between said axle assembly and the main frame for latching the two together for road transport of the trailer by the tow vehicle, wherein the main frame is pulled or pushed by the vehicle and the latter pulls or pushes the axle assembly.

2. A boat trailer as defined in claim 1 wherein said pivotal means of connection between the tow vehicle and the main frame comprises an auxiliary frame, the last-mentioned frame being the only frame part for connection to the tow vehicle.

3. A boat trailer as defined in claim 1 wherein a winch and bow rest are provided on the main frame, the winch being operative on retrieval of the boat to bring the boat up to the bow rest, before the vehicle pulls the main frame forwardly on the axle assembly.

4. A boat trailer as defined in claim 1 wherein there is provided coacting self-operating latch means between the main frame and the axle assembly operative, when the frame is projected rearwardly by the tow vehicle to the extent permitted on boat launching, to latch the axle assembly to the main frame so that if movement of the wheels is no longer restrained thereafter, rearward sliding movement of the axle assembly with reference to the main frame is prevented.

5. A boat trailer as defined in claim 1 wherein said pivotal means of connection between the tow vehicle and the main frame comprises an auxiliary frame including a draw bar connected to the vehicle for pivotal movement both on a horizontal axis and a vertical axis, which auxiliary frame has a pivotal connection to the main frame rearwardly of the forward end of the latter, the main frame having forwardly of the last-mentioned pivotal connection a winch and bow rest, the winch being operative on retrieval of the boat to bring the boat up to the bow rest, before the vehicle pulls the main frame forwardly on the axle assembly.

6. A boat trailer as defined in claim 1 wherein said pivotal means of connection between the tow vehicle and the main frame comprises an auxiliary frame including a draw bar connected to the vehicle for pivotal movement both on a horizontal axis and a vertical axis, which auxiliary frame has a pivotal connection to the main frame rearwardly of the forward end of the latter, the main frame having forwardly of the last-mentioned pivotal connection means coacting with means on the auxiliary frame to hold down the forward end of the main frame for road transport of the trailer.

7. A boat trailer as defined in claim 1 wherein the main frame is provided at its rear portion at opposite sides thereof with hollow, sealed, rotary elements engageable with the launching ramp when the main frame is tilted on launching the boat.

8. A boat trailer as defined in claim 1 wherein hull guide means are provided on the main frame at the rear portion and at each side thereof extending above said boat cradle means to center the hull with reference to the main frame as the main frame and boat are hauled forwardly on said axle assembly by the tow vehicle.

9. A boat trailer as defined in claim 1 wherein a winch and bow rest are provided on the main frame, the winch being operative on retrieval of the boat to bring the boat up to the bow rest, before the vehicle pulls the main frame forwardly on the axle assembly, coacting self-operating latch means being provided between the main frame and the axle assembly operative, when the frame is projected rearwardly by the tow vehicle to the extent permitted on boat launching, to latch the axle assembly to the main frame so that, if movement of the wheels is no longer restrained thereafter, rearward sliding movement of the axle assembly with reference to the main frame is prevented.

10. A boat trailer as defined in claim 1 wherein said pivotal means of connection between the tow vehicle and the main frame comprises an auxiliary frame including a draw bar connected to the vehicle for pivotal movement both on a horizontal axis and a vertical axis, which auxiliary frame has a pivotal connection to the main frame rearwardly of the forward end of the latter, the main frame having forwardly of the last-mentioned pivotal connection means coacting with means on the auxiliary frame to hold down the forward end of the main frame for road transport of the trailer, hull guide means being provided on the main frame at the rear portion and at each side thereof extending above said boat cradle means to center the hull with reference to the main frame as the main frame and boat are hauled forwardly on said axle assembly by the tow vehicle.

References Cited
UNITED STATES PATENTS

| | | | |
|---|---|---|---|
| 3,140,003 | 7/1964 | Horner | 214—505 |
| 3,357,581 | 12/1967 | Scott | 214—505 |

ALBERT J. MAKAY, Primary Examiner

U.S. Cl. X.R.

280—80